United States Patent
Yanagimachi et al.

(10) Patent No.: US 12,431,258 B2
(45) Date of Patent: Sep. 30, 2025

(54) PASTE AND CONDUCTIVE FILM AND THEIR PRODUCTION METHODS

(71) Applicants: Murata Manufacturing Co., Ltd., Nagaokakyo (JP); DREXEL UNIVERSITY, Philadelphia, PA (US)

(72) Inventors: Akimaro Yanagimachi, Nagaokakyo (JP); Masashi Koyanagi, Nagaokakyo (JP); Yuusuke Ogawa, Nagaokakyo (JP); Louisiane Verger, Rennes (FR); Michel W. Barsoum, Moorestown, NJ (US)

(73) Assignees: MURATA MANUFACTURING CO., LTD., Nagaokakyo (JP); DREXEL UNIVERSITY, Philadelphia, PA (US)

( * ) Notice: Subject to any disclaimer, the term of this patent is extended or adjusted under 35 U.S.C. 154(b) by 345 days.

(21) Appl. No.: 17/894,609

(22) Filed: Aug. 24, 2022

(65) Prior Publication Data

US 2022/0406486 A1    Dec. 22, 2022

Related U.S. Application Data

(63) Continuation of application No. PCT/JP2021/007070, filed on Feb. 25, 2021.

(60) Provisional application No. 62/981,737, filed on Feb. 26, 2020.

(51) Int. Cl.
     *H01B 1/14*      (2006.01)
     *H01B 1/20*      (2006.01)
     *H01B 5/14*      (2006.01)

(52) U.S. Cl.
     CPC ............ *H01B 1/20* (2013.01); *H01B 5/14* (2013.01)

(58) Field of Classification Search
     CPC ................................ H01B 1/02; H01B 1/14
     See application file for complete search history.

(56) References Cited

U.S. PATENT DOCUMENTS

| | | |
|---|---|---|
| 2017/0098856 A1 | 4/2017 | Zhamu et al. |
| 2017/0294546 A1 | 10/2017 | Ghidiu et al. |

FOREIGN PATENT DOCUMENTS

| | | |
|---|---|---|
| CN | 106185936 A | 12/2016 |
| CN | 107146650 A | 9/2017 |
| CN | 107381517 A | 11/2017 |
| CN | 110752364 A | 2/2020 |
| WO | 2016049109 A2 | 3/2016 |
| WO | 2017105572 A2 | 6/2017 |
| WO | 2019181526 A1 | 9/2019 |

OTHER PUBLICATIONS

Self-Assembly of Transition Metal Oxide Nanostructures on MXene Nanosheets for Fast and Stable Lithium Storage, and Supporting Information, Liu et al., Adv. Mater. 2018, 30, 1707334.*

Deng et al., "Fast Gelation of Ti3C2Tx MXene Initiated by Metal Ions," Advanced Materials, 2019, vol. 31, Issue 43, 1902432, 7 pages.

International Search Report in PCT/JP2021/007070, mailed Apr. 27, 2021, 3 pages.

Lyu et al., "Large-Area MXene Electrode Array for Flexible Electronics," ACS Nano, 2019, vol. 13, Issue 10, pp. 11392-11400.

Shankar et al., "Electrochemical Determination of Adrenaline Using MXene/Graphite Composite Paste Electrodes," ACS Applied Materials & Interfaces, 2018, vol. 10, pp. 43343-43351.

* cited by examiner

*Primary Examiner* — Haidung D Nguyen
(74) *Attorney, Agent, or Firm* — ArentFox Schiff LLP

(57) ABSTRACT

A paste that includes particles of a layered material in an ammonia aqueous solution. The particles include one or plural layers, the layers having a layer body represented by $M_mX_n$, wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, and a hydrogen atom, wherein the paste has a viscosity of 1 Pa·s or more at a shear velocity of 1/s when the paste has a solid content concentration of 1.0% by mass.

18 Claims, 7 Drawing Sheets

PASTE AND CONDUCTIVE FILM AND THEIR PRODUCTION METHODS

CROSS REFERENCE TO RELATED APPLICATIONS

The present application is a continuation of International application No. PCT/JP2021/007070, filed Feb. 25, 2021, which claims priority to U.S. Patent Application No. 62/981,737, filed Feb. 26, 2020, the entire contents of each of which are incorporated herein by reference.

FIELD OF THE INVENTION

The present invention relates to a paste and a conductive film and their production methods.

BACKGROUND OF THE INVENTION

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electrical devices. For example, Non Patent Literature 1 reports that when MXene is used as an electrode material for a field effect transistor, the work function can be reduced by chemically doping MXene with $NH_3$. Further, Non Patent Literature 2 reports that: a dispersion liquid in which MXene is dispersed in water gels with metal ions such as $Fe^{2+}$ to form a hydrogel; and the formation of such a hydrogel is considered to be due to the fact that MXene (more specifically, MXene nanosheet) forms a 3D (three-dimensional) network via metal ions.

Non Patent Literature 1: Benzheng Lyu et al., "Large-Area MXene Electrode Array for Flexible Electronics", ACS Nano, 2019, Volume 13, Issue 10, pp. 11392-11400

Non Patent Literature 2: Yaqian Deng et al., "Fast Gelation of $Ti_3C_2T_x$ MXene Initiated by Metal Ions", Advanced Materials, 2019, Volume 31, Issue 43, 1902432

SUMMARY OF THE INVENTION

When MXene forms a 3D network in a paste or conductive film containing MXene, the electrical properties and physical properties may differ compared to when a 3D network is not formed, so that it is expected that the application of MXene to various electrical devices will be further promoted and expanded.

Non Patent Literature 2 describes that the 3D network of MXene is considered to be formed by metal ions binding to hydroxyl groups of the terminal T of MXene. Since such metal ions block the hydroxyl groups that can be the active sites of MXene, it is desirable depending on an electrical device to remove the metal ions while substantially maintaining the 3D network of MXene. However, there is the drawback that it is not easy to remove the metal ions while substantially maintaining the 3D network of MXene.

On the other hand, Non Patent Literature 1 describes that the mechanism of doping with $NH_3$ is considered to be due to the formation of hydrogen bonds between MXene and $NH_3$. However, Non Patent Literature 1 never mentions the 3D network of MXene. In Non Patent Literature 1, an MXene-water mixture and an ammonia aqueous solution are simply mixed, and according to the research by the present inventors, it is considered that the 3D network of MXene is not formed by such a method.

An object of the present invention is to provide a paste and conductive film in which the 3D network of MXene is formed of a substance that can be more easily removed than metal ions, and their production methods.

According to one aspect of the present invention, a paste is provided, which comprises an ammonia aqueous solution; and particles of a layered material in the an ammonia aqueous solution, the particles of the layered material comprising one or plural layers, the one or plural layers comprising a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, and a hydrogen atom, wherein the paste has a viscosity of 1 Pa·s or more at a shear velocity of 1/s when the paste has a solid content concentration of 1.0% by mass.

According to another aspect of the present invention, a conductive film is provided which comprises particles of a layered material comprising one or plural layers, the one or plural layers comprising a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, and a hydrogen atom, wherein a ratio of $S_{(110)}$ to $S_{(002)}$ is 2.0% or more when the conductive film is subjected to X-ray diffraction measurement, where $S_{(002)}$ and $S_{(110)}$ represent peak-intensity areas of (002) and (110) of the layered material, respectively.

According to still another aspect of the present invention, a method for producing a paste is provided which comprises: preparing a mixture of an ammonia aqueous solution and particles of a layered material comprising one or plural layers, the one or plural layers comprising a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, and a hydrogen atom; and applying a shear force to the mixture to obtain a paste having a viscosity higher than that of the mixture.

According to still another aspect of the present invention, a method for producing a conductive film is provided, which comprises forming a precursor of a conductive film using the paste produced by the method for producing the paste according to any one of the above; and drying the precursor to obtain a conductive film.

According to still another aspect of the present invention, a paste is provided, which comprises particles of a layered material in an ammonia aqueous solution, the particles of the layered material comprising one or plural layers, the one or plural layers comprising a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, and a hydrogen atom, wherein the particles are arranged in a three-dimensional network via ammonium ions.

According to the present invention, there are provided a paste and conductive film in which the 3D network of MXene is formed via ammonia that can be more easily removed than metal ions, and their production methods. The formation of the 3D network of MXene is determined, as described later, based on a viscosity in the case of the paste, and based on the ratio of the peak-intensity area of (110) of MXene to the peak-intensity area of (002) of MXene (also simply referred to as a "peak-intensity area ratio") in the case of the conductive film.

DETAILED DESCRIPTION OF THE PREFERRED EMBODIMENTS

Embodiment 1: Paste

Hereinafter, the paste according to one embodiment of the present invention will be described in detail through the production method thereof, but the paste of the present invention is not limited to such an embodiment.

Figure 1:
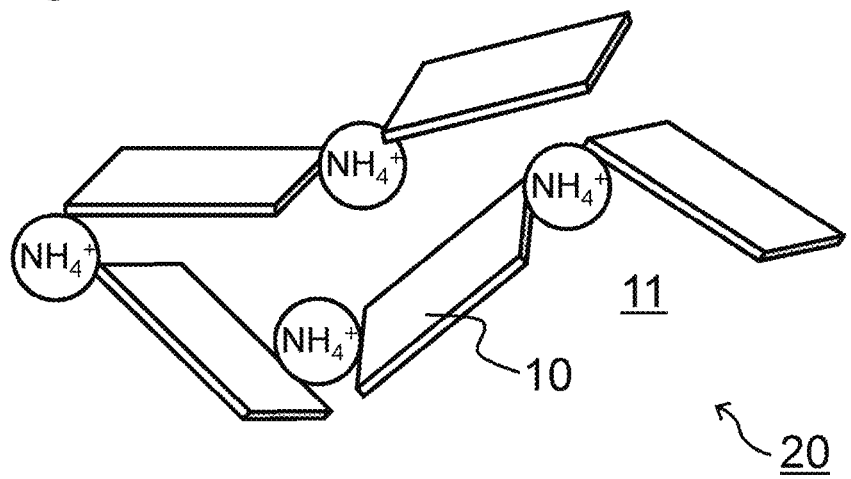
FIG. 1 is a schematic view showing a paste according to one embodiment of the present invention.

With reference to FIG. 1, a paste 20 of the present embodiment contains particles 10 of a predetermined layered material in an ammonia aqueous solution 11, and the paste 20 shows a viscosity of 1 Pa·s or more at a shear velocity of 1/s, when the paste 20 is measured by conditioning the paste at a solid content concentration of 1.0% by mass. From another point of view, the paste 20 of the present embodiment contains particles 10 of a predetermined layered material in the ammonia aqueous solution 11, and these particles 10 form a three-dimensional network via ammonium ions.

A method for producing the paste 20 of the present embodiment comprises: (a) preparing a mixture of the particles 10 of a predetermined layered material and the ammonia aqueous solution 11; and (b) applying a shear force to the mixture to obtain the paste 20 having a higher viscosity than the mixture.

Step (a)

First, particles of a predetermined layered material are prepared. The predetermined layered material that can be used in the present embodiment is MXene, which is defined as follows:

MXene is a layered material comprising one or plural layers,
the one or plural layers comprising
a layer body represented by a formula below:

$$M_mX_n$$

wherein M is at least one metal of Group 3, 4, 5, 6, or 7, and can comprise at least one selected from the group consisting of so-called early transition metals, for example, Sc, Ti, Zr, Hf, V, Nb, Ta, Cr, Mo, and Mn, X is a carbon atom, a nitrogen atom, or a combination thereof, n is not less than 1 and not more than 4, and m is more than n but not more than 5 (the layer body can have a crystal lattice in which each X is located in the octahedral array of M), and a modifier or terminal T existing on a surface of the layer body (more specifically, on at least one of both surfaces, facing each other, of the layered body), wherein T is at least one selected from the group consisting of a hydroxyl group, a fluorine atom, a chlorine atom, an oxygen atom, and a hydrogen atom (the layered material can be understood as a layered compound and also represented by "$M_mX_nT_s$," wherein s is any number and traditionally x may be used instead of s). Typically, n can be 1, 2, 3, or 4, but is not limited thereto.

In the above formula of MXene, M is preferably at least one selected from the group consisting of Ti, Zr, Hf, V, Nb, Ta, Cr, Mo, and Mn, and more preferably at least one selected from the group consisting of Ti, V, Cr, and Mo.

Such MXene can be synthesized by selectively etching (removing and optionally layer-separating) A atoms (and optionally parts of M atoms) from a MAX phase. The MAX phase is represented by the formula below:

wherein M, X, n, and m are as described above, A is at least one element of Group 12, 13, 14, 15, or 16, normally an element of Group A, typically of Group IIIA and Group IVA, more specifically can comprise at least one selected from the group consisting of Al, Ga, In, Tl, Si, Ge, Sn, Pb, P, As, S, and Cd, and is preferably Al; and has a crystal structure in which a layer composed of A atoms is located between the two layers represented by $M_mX_n$ (may have a crystal lattice in which each X is located in the octahedral array of M). When typically m=n+1, but not limited thereto, the MAX phase includes repeating units in which each one layer of X atoms is disposed in between adjacent layers of n+1 layers of M atoms (these are also collectively referred to as an "$M_mX_n$ layer"), and a layer of A atoms ("A atom layer") is disposed as a layer next to the (n+1)th layer of M atoms. The A atom layer (and optionally a part of the M atoms) is removed by selectively etching (removing and optionally layer-separating) the A atoms (and optionally a part of the M atoms) from the MAX phase. The surface of the exposed $M_mX_n$ layer is modified by hydroxyl groups, fluorine atoms, chlorine atoms, oxygen atoms, hydrogen atoms, etc., existing in an etching liquid (usually, an aqueous solution of a fluorine-containing acid is used, but not limited thereto), so that the surface is terminated. The etching can be carried out using an etching liquid containing $F^-$, and a method using, for example, a mixed liquid of lithium fluoride and hydrochloric acid, a method using hydrofluoric acid, or the like may be used. Then, the layer separation of MXene (delamination, separating multilayer MXene into single-layer MXene and/or few-layer MXene) may be appropriately promoted by any suitable post-treatment (e.g., ultrasonic treatment, handshake, automatic shaker, or the like). Since the shear force of an ultrasonic treatment is too large so that the MXene particles can be destroyed, it is desirable to apply an appropriate shear force by handshake, an automatic shaker or the like, when it is desired to obtain a two-dimensional MXene (preferably single-layer MXene and/or few-layer MXene) having a larger aspect ratio.

MXenes whose above formula $M_mX_n$ is expressed as below are known:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $Mo_{1.3}Y_{0.6}C$ (wherein "1.3" and "0.6" means about 1.3 (=4/3) and about 0.6 (=2/3), respectively), $Ti_3C_2$, $Ti_3N_2$, $Ti_3$ (CN), $Zr_3C_2$, $(Ti,V)_3C_2$, $(Ti_2Nb)$ $C_2$, $(Ti_2Ta)C_2$, $(Ti_2Mn)$ $C_2$, $Hf_3C_2$, $(Hf_2V)$ $C_2$, $(Hf_2Mn)$ $C_2$, $(V_2Ti)$ $C_2$, $(Cr_2Ti)$ $C_2$, $(Cr_2V)$ $C_2$, $(Cr_2Nb)$ $C_2$, $(Cr_2Ta)$ $C_2$, $(Mo_2Sc)$ $C_2$, $(Mo_2Ti)$ $C_2$, $(Mo_2Zr)$ $C_2$, $(Mo_2Hf)$ $C_2$, $(Mo_2V)$ $C_2$, $(Mo_2Nb)$ $C_2$, $(Mo_2Ta)$ $C_2$, $(W_2Ti)$ $C_2$, $(W_2Zr)$ $C_2$, $(W_2Hf)$ $C_2$, $Ti_4N_3$, $V_4C_3$, $Nb_4C_3$, $Ta_4C_3$, $(Ti, Nb)_4C_3$, $(Nb, Zr)_4C_3$, $(Ti_2Nb_2)$ $C_3$, $(Ti_2Ta_2)$ $C_3$, $(V_2Ti_2)$ $C_3$, $(V_2Nb_2)$ $C_3$, $(V_2Ta_2)$ $C_3$, $(Nb_2Ta_2)$ $C_3$, $(Cr_2Ti_2)$ $C_3$, $(Cr_2V_2)$ $C_3$, $(Cr_2Nb_2)$ $C_3$, $(Cr_2Ta_2)$ $C_3$, $(Mo_2Ti_2)$ $C_3$, $(Mo_2Zr_2)$ $C_3$, $(Mo_2Hf_2)$ $C_3$, $(Mo_2V_2)$ $C_3$, $(Mo_2Nb_2)$ $C_3$, $(Mo_2Ta_2)$ $C_3$, $(W_2Ti_2)$ $C_3$, $(W_2Zr_2)$ $C_3$, and $(W_2Hf_2)$ $C_3$.

Typically in the above formula, M can be titanium or vanadium and X can be a carbon atom or a nitrogen atom. For example, the MAX phase is $Ti_3AlC_2$ and MXene is $Ti_3C_2T_s$ (in other words, M is Ti, X is C, n is 2, and m is 3).

It is noted, in the present invention, MXene may contain remaining A atoms at a relatively small amount, for example, at 10% by mass or less with respect to the original amount of A atoms. The remaining amount of A atoms can be preferably 8% by mass or less, and more preferably 6% by mass or less. However, even if the remaining amount of A atoms exceeds 10% by mass, there may be no problem depending on the use and conditions of use of the paste (and the conductive film obtained thereby).

Figure 2A:
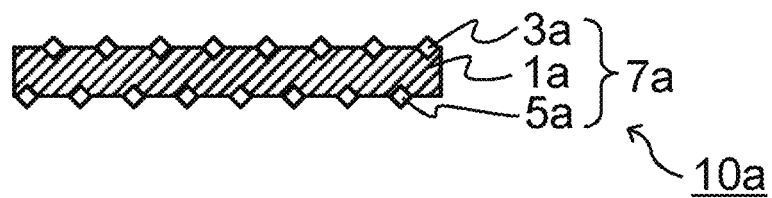
FIGS. 2(a) and 2(b) are schematic cross-sectional views showing MXene that is a layered material that can be used in a paste according to one embodiment of the present invention.
Figure 2B:
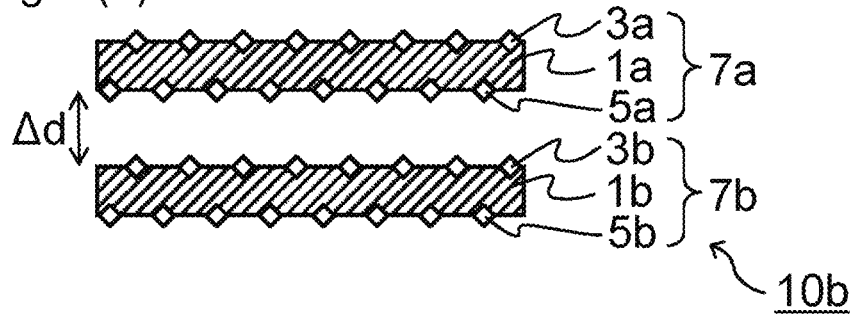

As schematically shown in FIGS. 2(a) and 2(b), the MXene (particles) 10 synthesized in this way can be a layered material containing one or plural MXene layers 7a, 7b (as examples of the MXene (particles) 10, FIG. 2(a) shows MXene 10a of one layer, and FIG. 2(b) shows MXene 10b of two layers, but is not limited to these examples). More specifically, the MXene layers 7a, 7b have layer bodies ($M_mX_n$ layers) 1a, 1b represented by $M_mX_n$, and modifiers or terminals T 3a, 5a, 3b, 5b existing on the surfaces of the layer bodies 1a, 1b (more specifically, on at least one of both surfaces, facing each other, of each layer). Therefore, the MXene layers 7a, 7b are also represented by "$M_mX_nT_s$," wherein s is any number. MXene 10 may be: one that exists as one layer obtained by such MXene layers being separated from one another (single-layer structure shown in FIG. 2(a), so-called single-layer MXene 10a); a laminate made of a plurality of MXene layers being stacked to be apart from each other (multilayer structure shown in FIG. 2(b), so-called multilayer MXene 10b); or a mixture thereof. MXene 10 can be particles (which can also be referred to as powders or flakes) as a collective entity composed of the single-layer MXene 10a and/or the multilayer MXene 10b. In the case of the multilayer MXene, two adjacent MXene layers (e.g., 7a and 7b) may not necessarily be completely separated from each other, but may be partially in contact with each other.

Although not limiting the present embodiment, the thickness of each layer of MXene (which corresponds to the MXene layers 7a, 7b) is, for example, not less than 0.8 nm and not more than 5 nm, and particularly not less than 0.8 nm and not more than 3 nm (which can vary mainly depending on the number of M atom layers included in each layer), and the maximum dimension in a plane (two-dimensional sheet plane) parallel to the layer is, for example, not less than 0.1 μm and not more than 200 μm, and particularly not less than 1 μm and not more than 40 μm.

In a case where MXene is a laminate (multilayer MXene), the inter-layer distance (or gap dimension, denoted as Δd in FIG. 2(b) in the individual laminate is, for example, not less than 0.8 nm and not more than 10 nm, particularly not less than 0.8 nm and not more than 5 nm, and more particularly about 1 nm. The maximum dimension in a plane (two-dimensional sheet plane) perpendicular to the stacking direction is, for example, not less than 0.1 μm and not more than 100 μm, and particularly not less than 1 μm and not more than 20 μm.

In a case where MXene is a laminate (multilayer MXene), the total number of layers in the individual laminate may be 2 or more but is, for example, not less than 50 and not more than 100,000, and particularly not less than 1,000 and not more than 20,000. The thickness in the stacking direction is, for example, not less than 0.1 μm and not more than 200 μm, and particularly not less than 1 μm and not more than 40 μm.

In a case where MXene is a laminate (multilayer MXene), it is preferable that MXene has a small number of layers. The term "small number of layers" means, for example, that the number of stacked layers of MXene is 6 or less. The thickness, in the stacking direction, of the multilayer MXene having a small number of layers is preferably 10 nm or less. In the present description, this "multilayer MXene having a small number of layers" (multilayer MXene in a narrow sense) is also referred to as "few-layer MXene."

In the present embodiment, MXene 10 is preferably particles (which can also be referred to as nanosheets), most of which are composed of the single-layer MXene 10a and/or the few-layer MXene. In other words, the proportion of particles (single-layer MXene and/or few-layer MXene) having a thickness, in the stacking direction, of 10 nm or less in the entire MXene particles can be 50% by volume or more.

It should be noted that these dimensions described above are determined as number average dimensions (e.g., number average of at least 40) based on photographs of a scanning electron microscope (SEM), a transmission electron microscope (TEM), or an atomic force microscope (AFM), or as distances in the real space calculated from the positions on the reciprocal lattice space of the (002) plane measured by an X-ray diffraction (XRD) method.

Then, a mixture of the above MXene particles 10 and the ammonia aqueous solution 11 (also referred to as "MXene-ammonia water mixture") is prepared. The ammonia aqueous solution 11 comprises an aqueous solvent and ammonia, and the ammonia can be in the form of ammonium ions ($NH_4^+$). The aqueous solvent is typically water, and in some cases, other liquid substances may be contained in a relatively small amount (e.g., 30% by mass or less, preferably 20% by mass or less based on the whole mass) in addition to water.

The ammonia aqueous solution that will make up the MXene-ammonia water mixture can be mixed with the MXene particles in any suitable manner on preparing the MXene-ammonia water mixture. For example, the MXene-ammonia water mixture may be obtained by adding MXene particles to an ammonia aqueous solution, or may be obtained by adding an MXene-water mixture containing MXene particles 10 in an aqueous solvent to an ammonia aqueous solution. In the latter case, the "ammonia concentration in the ammonia aqueous solution" refers to the ammonia concentration in the ammonia aqueous solution obtained after the addition (combination of the ammonia aqueous solution before the addition and the aqueous solvent in the MXene-water mixture), and it can be considered that the ammonia concentration is substantially the same even after the later-described step of applying a shear force.

The ammonia concentration in the ammonia aqueous solution (ammonia aqueous solution constituting the MXene-ammonia water mixture) can be appropriately selected depending on the properties, etc., desired for the paste (and the conductive film obtained thereby). For example, in order to obtain a paste having excellent coatability because MXene particles do not aggregate and neither unevenness nor crack is caused, the ammonia concentration in the ammonia aqueous solution is, for example, not less than 0.005 mol/L and less than 1.3 mol/L, preferably not less than 0.01 mol/L and not more than 1.2 mol/L, and can be more preferably 0.02 mol/L or more, even more preferably 0.03 mol/L or more, and/or more preferably 1.0 mol/L or less, and even more preferably 0.83 mol/L or less.

The content ratio of MXene in the MXene-ammonia water mixture (which can also be understood as the solid content concentration in the present embodiment) is not particularly limited, but may be, for example, 0.5 to 2.5% by mass.

Step (b)

Next, a shear force is applied to the MXene-ammonia water mixture prepared above to obtain a paste having a higher viscosity than the MXene-ammonia water mixture before applying the shear force.

By applying a shear force to the MXene-ammonia water mixture, the MXene particles 10 form a 3D network via ammonium ions ($NH_4^+$), as illustrated in FIG. 1. It is considered that thereby the viscosity of the MXene-ammonia water mixture increases. Although the present invention is not bound by any theory, ammonium ions are monovalent and cannot form the 3D network of MXene by mere mixing, but it is considered that the 3D network of MXene can be formed by applying a shear force to some extent. The MXene surface is negatively charged, and it is considered that the network is formed by the interaction between these charges and cations. The magnitude of the interaction is proportional to the valence of the cation as counterpart. It is presumed for a monovalent cation with small interaction that the formation of the 3D network is promoted by actively applying energy by shear force.

The paste 20 of the present embodiment thus obtained contains the MXene particles 10 in the ammonia aqueous solution 11, and the paste 20 shows a viscosity of 1 Pa·s or more at a shear velocity of 1/s, when the paste is measured by conditioning the paste at a solid content concentration of 1.0% by mass, and preferably 2 Pa·s or more, and the upper limit is not particularly limited, but, for example, may be 100 Pa·s or less. According to the findings of the present inventors, it can be determined that MXene forms a 3D network by achieving such a value of viscosity.

The viscosity is defined as one of the physical properties of the paste 20 produced by the present embodiment. Since the value of viscosity of the paste may differ mainly depending on the solid content concentration and the shear velocity, measurement conditions are set such that the solid content concentration is 1.0% by mass and the shear velocity is 1/s. As a matter of course, the solid content concentration of the paste 20 of the present embodiment and the shear velocity at the time when shear force is applied are not limited to these values. If the solid content concentration of the paste 20 is not 1.0% by mass, pure water is added to the paste 20 or the paste 20 is dried to adjust the solid content concentration to 1.0% by mass and the viscosity at the time may be measured.

The method for applying a shear force can be carried out by using, for example, a shaker, a share mixer, or the like, and appropriately selecting the strength and time for applying the shear force such that the above viscosity is obtained. Although not limiting the present embodiment, a shear force, in the examples described later, was applied by treating the MXene-ammonia water mixture with an automatic shaker (manufactured by FAST & FLUID, SK-550) for 15 minutes. It is desirable that the shear force is applied so as not to destroy the MXene particles, and it is desirable that anisotropic energy is applied to the MXene particles (e.g., flakes, etc.).

In the paste 20 of the present embodiment, the description described above in relation to its production method can be applied as it is, unless otherwise specified.

According to the paste 20 of the present embodiment, the 3D network of MXene is formed by ammonium ions, and the ammonium ions can be removed more easily than metal ions, for example, only by heating. The removal of the ammonium ions may be carried out after a desired member (which can be, for example, a conductive film as described later in Embodiment 2, but not limited to this) is produced by using the paste 20 of the present embodiment. This allows the ammonium ions to be removed in the member while substantially maintaining the 3D network of MXene.

Embodiment 2: Conductive Film

Hereinafter, a conductive film according to one embodiment of the present invention will be described in detail through its production method, but the conductive film of the present invention is not limited to such an embodiment.

Figure 3:
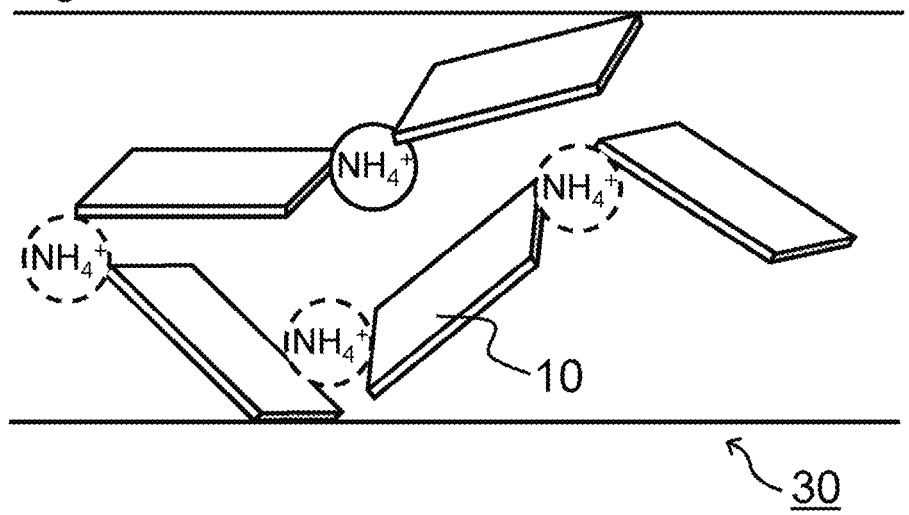
FIG. 3 is a schematic cross-sectional view showing a conductive film according to one embodiment of the present invention.

With reference to FIG. 3, a conductive film 30 of the present embodiment contains the MXene particles 10, and the ratio of $S_{(110)}$ to $S_{(002)}$ is 2.0% or more when the conductive film 30 is subjected to X-ray diffraction (XRD) measurement, and where $S_{(002)}$ and $S_{(110)}$ represent peak-intensity areas of (002) and (110) of the MXene, respectively. In FIG. 3, the removed ammonium ions are schematically shown by dotted circles.

A method for producing the conductive film 30 of the present embodiment comprises: (c) forming a precursor of a conductive film by using the paste 20 produced by the production method described in Embodiment 1; and (d) drying the precursor to obtain the conductive film.

Step (c)

First, a precursor of a conductive film (also referred to as a "precursor film") is formed by using the paste 20 obtained by the production method described above in Embodiment 1. The method for forming the precursor is not particularly limited, and for example, coating, suction filtration, spray, or the like can be used. More specifically, the paste 20 is used as it is, or appropriately adjusted (e.g., diluted with an aqueous solvent) in order to be coated onto any suitable substrate (which may constitute a predetermined member together with the conductive film, or may be finally separated from the conductive film) by using a barcoater, roll coater, spin coater, blade, or the like. Thereby, a precursor can be formed on the substrate. Alternatively, the paste 20 is appropriately adjusted (e.g., diluted with an aqueous solvent, the solid content concentration is 0.01 to 0.2% by mass), and is subjected to suction filtration through a filter (which may constitute a predetermined member together with the conductive film, or may be finally separated from the conductive film) installed in a nutsche or the like. Thereby, the ammonia aqueous solution (particularly the aqueous solvent) is at least partially removed, so that a precursor can be formed on the filter. The filter is not particularly limited, but a membrane filter (e.g., one having a pore diameter of 0.22 μm) or the like can be used. Alternatively, the paste 20 is appropriately adjusted (e.g., diluted with an aqueous solvent, the solid content concentration is 0.01 to 2% by mass) to be sprayed onto any suitable substrate (which may constitute a predetermined member together with the conductive film, or may be finally separated from the conductive film) with a spray gun, an airbrush, or the like. Thereby, a precursor can be formed on the substrate.

In such a precursor (precursor film), it is considered that the 3D network of MXene exists as it is formed via ammonium ions.

Step (d)

Next, the precursor formed above is dried to obtain the conductive film 30. In the present invention, the "drying" means removing the aqueous solvent that can exist in the precursor. During the drying, ammonia (which may include ammonia and ammonium ions existing in the ammonia aqueous solution, in which the ammonium ions may be free in the ammonia aqueous solution or may contribute to the formation of the 3D network of MXene) may or may not be removed from the precursor together with the aqueous solvent.

When the drying is performed under mild conditions such as natural drying (typically placed in the air atmosphere under normal temperature and normal pressure) or air drying (blowing air), ammonia can remain in the conductive film obtained after the drying. The remaining ammonia may be in the form of ammonium ions that contribute to the formation of the 3D network of MXene.

When the drying is performed under relatively severe conditions such as heat drying and vacuum drying, ammonia is removed from the precursor together with the aqueous solvent during such drying, and the conductive film obtained after the drying can be substantially free of ammonia.

Alternatively, when it is desirable, depending on the application of the conductive film, to remove ammonia from the conductive film (e.g., to revive the active sites blocked by ammonium ions), ammonia may be positively separated by heating or the like during and/or after the drying in order to obtain a conductive film.

The step (c) and/or the step (d) may be repeated as appropriate until the desired conductive film thickness is obtained. For example, the combination of the spraying in the step (c) and the drying in the step (d) may be repeated multiple times.

The conductive film 30 of the present embodiment thus obtained contains the MXene particles 10, and when the conductive film 30 is subjected to X-ray diffraction (XRD) measurement, and peak-intensity areas of (002) and (110) of the MXene obtained by the measurement are denoted as $S_{(002)}$ and $S_{(110)}$, respectively, the ratio z (also simply referred to as a "peak-intensity area ratio") of $S_{(110)}$ to $S_{(002)}$ is 2.0% or more, preferably 4% or more, more preferably 6% or more, and even more preferably 8% or more, and the upper limit is not particularly limited, but may be, for example, 40% or less. According to the findings of the present inventors, it can be determined that by achieving such a value of peak-intensity area ratio z, the 3D network of MXene exists via ammonium ions and/or with ammonium ions removed.

The peak-intensity area ratio z is calculated by the following formula:

$$z(\%) = S_{(110)}/S_{(002)} \times 100$$

The peak-intensity area $S_{(002)}$ of (002) of MXene and the peak-intensity area $S_{(110)}$ of (110) of MXene are calculated from the following formulae, respectively, wherein
using an XRD pattern obtained by subjecting the conductive film to XRD measurement using a 2θ/θ method:
the XRD pattern is expressed as the intensity of the vertical axis I(cps)=f(x) with respect to an angle 2θ(°)=x of the horizontal axis;
as to an angle $2\theta = 2\theta_{(002)}$ corresponding to the peak of (002) of MXene, $S_{(002)}$ is calculated within the angle range of $2\theta = x_1$ to $x_2$(°), wherein $x_1 < x_2$; and
as to an angle $2\theta = 2\theta_{(110)}$ corresponding to the peak of (110) of MXene, $S_{(110)}$ is calculated within the angle range of $2\theta = x_3$ to $x_4$(°), wherein $x_3 < x_4$.

$$S_{(002)} = S1_{(002)} - S2_{(002)} - S3_{(002)}$$

wherein $$S1_{(002)} = \int_{x_1}^{x_2} f(x)dx$$

$$S2_{(002)} = |f(x_2) - f(x_1)| \times (x_2 - x_1)/2$$

when $f(x_1) \leq f(x_2)$, $S3_{(002)} = f(x_1) \times (x_2 - x_1)$ when $f(x_1) > f(x_2)$, $S3_{(002)} = f(x_2) \times (x_2 - x_1)$ $S_{(110)} = S1_{(110)} - S2_{(110)} - S3_{(110)}$ wherein $S1_{(110)} = \int_{x_3}^{x_4} f(x)dx$ $S2_{(110)} = |f(x_4) - f(x_3)| \times (x_4 - x_3)/2$ when $f(x_3) \leq f(x_4)$, $S3_{(110)} = f(x_3) \times (x_4 - x_3)$ when $f(x_3) > f(x_4)$, $S3_{(110)} = f(x_4) \times (x_4 - x_3)$ In the case of $S_{(002)}$, $S1_{(002)}$ in the first term means the area below I=f(x) and above I=0 within the range of $2\theta = x_1$ to $x_2$, and the sum of $S2_{(002)}$ in the second term and $S3_{(002)}$ in the third term means the trapezoidal region enclosed by $(x_1, f(x_1))$, $(x_2/f(x^2))$, $(x_2, 0)$, $(x_1, 0)$ ($S2_{(002)}$ is a triangular region, $S3_{(002)}$ is a rectangular region, and when $f(x_1) = f(x_2)$ $S2_{(002)} = 0$, which forms a rectangular region as a whole). The case of $S_{(110)}$ can also be understood in the same way.

The above f(x) is obtained by connecting adjacent points of the result of measuring the XRD pattern. The lower limit $x_1$ and the upper limit $x_2$ of the angle range for determining $S_{(002)}$ are set such that the peak derived from the (002) plane of the MXene is sufficiently included, and can roughly be $2\theta_{(002)} \pm 1$ to $3(°)$, and for example, is $2\theta_{(002)} - 3(°)$ and $2\theta_{(002)} + 1(°)$. The lower limit $x_3$ and the upper limit $x_4$ of the angle range for determining $S_{(110)}$ are set such that the peak derived from the (110) plane of the MXene is sufficiently included, and can roughly be $2\theta_{(110)} \pm 1$ to $3(°)$ and for example, is $2\theta_{(110)} \pm 1(°)$. Although not limiting the present embodiment, when MXene is $Ti_3C_2T_s$, it is set that $x_1 = 3°$ and $x_2 = 7°$ in the case of $2\theta_{(002)} = 6°$, and it is set that $x_3 = 63°$ and $x_4 = 65°$ in the case of $2\theta_{(110)} = 64°$.

Figure 4:
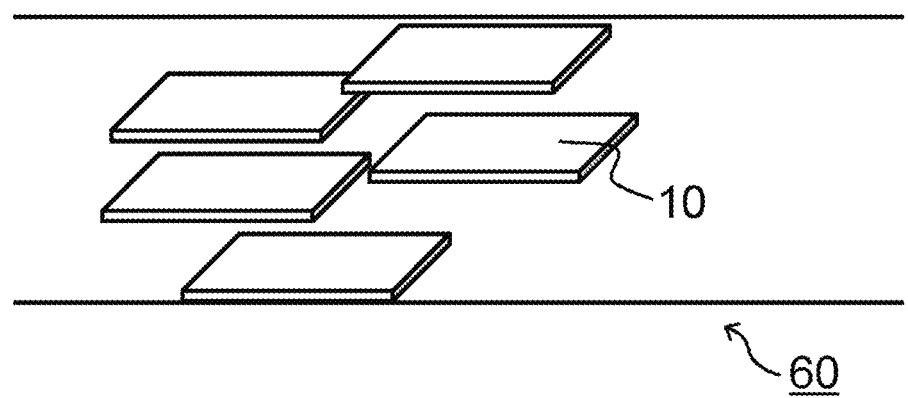
FIG. 4 is a schematic cross-sectional view showing, for the purpose of comparison with the present invention, a conductive film in which a 3D network is not formed.

The (002) plane of MXene is a plane parallel to the two-dimensional sheet plane of MXene (planes parallel to the layers of MXene), and the fact that $S_{(002)}$ is larger in the XRD pattern obtained by subjecting the conductive film to XRD measurement means that there are more MXene particles whose two-dimensional sheet plane of MXene is aligned (parallel) to the main plane of the conductive film (when no 3D network of MXene is formed, it tends to become a conductive film 60 as shown in FIG. 4). The (110) plane of MXene is a plane perpendicular to the two-dimensional sheet plane of MXene, and the size of $S_{(110)}$ in the XRD pattern obtained by subjecting the conductive film to XRD measurement shows the degree of existence of MXene particles whose two-dimensional sheet plane of MXene is not aligned (perpendicular) to the main plane of the conductive film. Therefore, the peak-intensity area ratio z is understood as an index indicating the random orientation of MXene particles in the conductive film, and it is considered that the formation of the 3D network of MXene (see FIG. 3) increases z.

Regarding other points in the conductive film 30 of the present embodiment, the description described above in relation to its production method can be applied as it is, unless otherwise specified.

The conductive film 30 of the present embodiment is in the form of a so-called film, and specifically, it may have two main surfaces facing each other. As to the conductive film 30, its thickness, its shape and dimensions when viewed in a plan view, and the like can be appropriately selected depending on the use of the conductive film 30.

According to the conductive film 30 of the present embodiment, the 3D network of MXene is formed via ammonium ions and/or with the ammonium ions removed, and if present, the ammonium ions can be removed more easily than metal ions, for example, only by heating.

According to the conductive film 30 of the present embodiment, the volume density of MXene can be decreased as compared with the case where the 3D network of MXene is not formed, but it is considered that higher conductivity can be obtained in the thickness direction of the conductive film 30.

The conductive film 30 of the present embodiment can be used for any suitable application. For example, it can be used as an electrode in any suitable electrical device, an ion adsorbent, a molecular adsorbent, a catalyst, etc.

The paste and the conductive film according to the embodiments of the present invention have been described in detail through their production methods, but various modifications can be made. The paste and the conductive film of the present invention may be produced by methods different from the production methods in the above embodiments. It should be noted that the methods for producing the paste and the conductive film of the present invention are not limited only to those that provide the paste and conductive film according to the above embodiments.

EXAMPLES

Example 1

Example 1 relates to an example in which a paste and a conductive film were produced by using an ammonia aqueous solution whose original ammonia concentration of 0.2 mol/L was diluted 6-fold (thus, an ammonia concentration of about 0.03 mol/L).

Preparation of MAX Powder

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined in an Ar atmosphere at 1350° C. for 2 hours. The fired body (block) thus obtained was crushed with an end mill to a maximum size of 40 μm or less. Thereby, $Ti_3AlC_2$ powder was obtained as MAX powder.

Preparation of MXene Particles

One g of the $Ti_3AlC_2$ powder obtained above was weighed, added to 10 mL of 12 mol/L hydrochloric acid together with 1 g of LiF, stirred with a stirrer at 35° C. for 24 hours, and a solid-liquid mixture (suspension) containing a solid component derived from the $Ti_3AlC_2$ powder was obtained. Regarding this mixture, the operation of washing with pure water and separating and removing the supernatant liquid using a centrifuge (the remaining sediment excluding the supernatant was subjected to washing again) was repeatedly carried out until the pH reached about 4. Thereby, sediment of $Ti_3C_2T_s$ particles was obtained as MXene particles.

Production of MXene Paste

The solid content concentration of the sediment of MXene particles obtained above was measured, and the sediment and pure water were mixed in appropriate amounts to obtain an MXene-water mixture (5 mL of pure water, 2% by mass of MXene). One mL of ammonia aqueous solution (0.2 mol/L) was added to this MXene-water mixture (5 mL of pure water, 2% by mass of MXene) to obtain an MXene-ammonia water mixture. Since this mixing operation dilutes the ammonia aqueous solution with an ammonia concentration of 0.2 mol/L 6-fold, the ammonia concentration of the ammonia aqueous solution in the MXene-ammonia water mixture is calculated to be about 0.03 mol/L (see Table 1). A shear force was applied to the obtained MXene-ammonia water mixture with an automatic shaker (manufactured by FAST & FLUID, SK-550) for 15 minutes. Thereby, the paste (MXene paste) of Example 1 was obtained. The solid content concentration of the obtained paste was 1.7% by mass.

Production of Conductive Film

The paste obtained above was coated onto a substrate (polyethylene terephthalate film, Toray Industries, Inc., Lumirror (registered trademark)) with a barcoater to a thickness of about 120 μm to form a precursor film composed of the paste. Then, the precursor film was dried by being naturally dried in an air atmosphere under normal pressure in a laboratory (about 25° C.) to obtain the conductive film of Example 1 derived from the precursor film (see FIG. 9, the coatability of the above paste is also shown in Table 1). The conductive film of Example 1 had a thickness of about 10 μm.

Comparative Example 1

The paste and conductive film of Comparative Example 1 were obtained in the same way as in Example 1 except that instead of adding 1 mL of an ammonia aqueous solution (0.2 mol/L) to the MXene-water mixture (5 mL of pure water, 2% by mass of MXene) in the production of the MXene paste of Example 1, 1 mL of pure water was added and a shear force was applied to the MXene-water mixture thus obtained with an automatic shaker (manufacture by FAST & FLUID, SK-550) for 15 minutes (see Table 1).

Comparative Example 2

The paste and conductive film of Comparative Example 2 were obtained in the same way as in Example 1 except that in the production of the MXene paste of Example 1, a shear force was not applied to the MXene-ammonia water mixture with an automatic shaker (manufactured by FAST & FLUID, SK-550) (see Table 1).

Examples 2 to 6

The pastes and conductive films of Examples 2 to 6 were obtained in the same way as in Example 1 except that instead of adding 1 mL of an ammonia aqueous solution (0.2 mol/L) to the MXene-water mixtures (5 mL of pure water, 2% by mass of MXene) in the production of the MXene paste of Example 1, 1 mL of ammonia aqueous solutions having different ammonia concentrations, as shown in Table 1, were added.

Examples 7 to 8

The pastes and conductive films of Examples 7 to 8 were obtained in the same way as in Example 1 except that instead of adding 1 mL of an ammonia aqueous solution (0.2 mol/L) to the MXene-water mixture (5 mL of pure water, 2% by mass of MXene) in the production of the MXene paste of Example 1, 2.5 mL of ammonia aqueous solutions having different ammonia concentrations, as shown in Table 1, were added (i.e., the ammonia aqueous solutions were diluted 3-fold).

TABLE 1

|  | Ammonia concentration (mol/L) | | Shear force | Coatability |
|---|---|---|---|---|
|  | Ammonia aqueous solution added | MXene-ammonia water mixture | | |
| Example 1 | 0.2 | 0.03 | Applied | Without crack Without unevenness |
| Comparative Example 1 | 0 | 0 | Applied | With cracks |
| Comparative Example 2 | 0.2 | 0.03 | Not applied | With cracks |
| Example 2 | 0.02 | 0.003 | Applied | Poor adaptivity, hard to spread |
| Example 7 | 0.03 | 0.01 | Applied | Without crack Without unevenness |
| Example 3 | 1 | 0.17 | Applied | Without crack Without unevenness |
| Example 4 | 5 | 0.83 | Applied | Without crack Without unevenness |
| Example 8 | 3.6 | 1.20 | Applied | Without crack Without unevenness |
| Example 5 | 8 | 1.33 | Applied | With agglomerates With unevenness |
| Example 6 | 10 | 1.67 | Applied | With agglomerates With unevenness |

Viscosity of Paste

Samples (solid content concentration 1.7% by mass) were separated from the pastes produced in Example 1 and Comparative Examples 1 to 2, respectively, and adjusted such that the solid content concentration was 1.0% by mass. Next, the viscosities of the samples adjusted to a solid content concentration of 1.0% by mass were measured over a range of shear velocity from 0.01 to 1000/s using a viscoelasticity measuring device (manufactured by Kitahama Seisakusho Co., Ltd., MCR302). The results of viscosity measurement are shown in FIG. 5.

Figure 5:
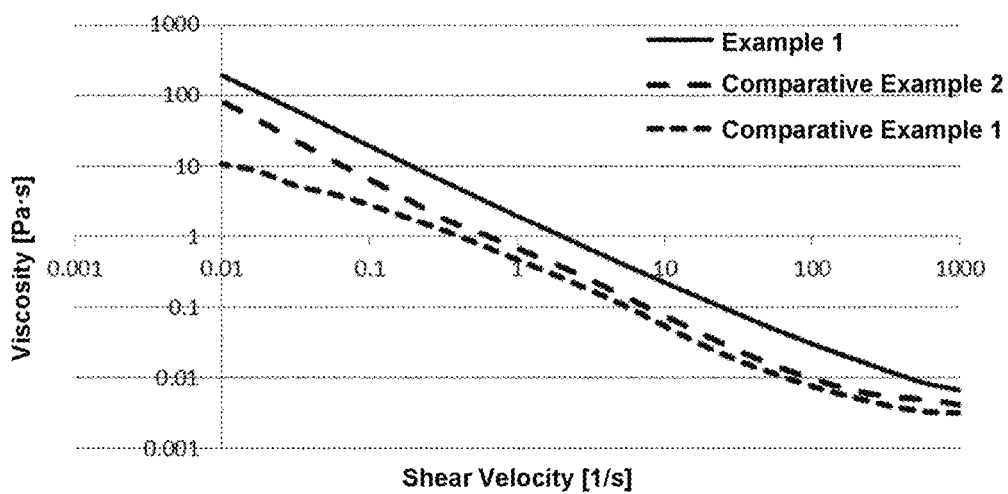
FIG. 5 is a graph showing the results of measuring the viscosities of the pastes produced in Example 1 and Comparative Examples 1 and 2.

As can be seen from FIG. 5, the paste of Example 1 (with ammonia, shear force applied) exhibited a higher viscosity over the range of shear velocity from 0.01 to 1000/s than the pastes of Comparative Example 1 (without ammonia, shear force applied) and Comparative Example 2 (with ammonia, shear force not applied). At a shear velocity of 1/s, the viscosity of the paste of Example 1 was 1.97 Pa·s, the viscosity of the paste of Comparative Example 1 was 0.47 Pa·s, and the viscosity of the paste of Comparative Example 2 was 0.67 Pa·s. Such an increase in viscosity is considered to be due to the formation of the 3D network of MXene via ammonium ions.

Peak-Intensity Area Ratio of Conductive Film

The conductive films produced in Example 1 and Comparative Examples 1 to 2 were fixed to a sample table of an X-ray diffractometer (manufactured by Rigaku Corp., MiniFlex600) with double-sided tape, and subjected to XRD measurement by a 2θ/θ method using a Cu tube, over a measurement range from 3 to 65°, at 50 step/°. The results of the XRD measurement are shown in FIGS. 6 to 8.

Figure 6:
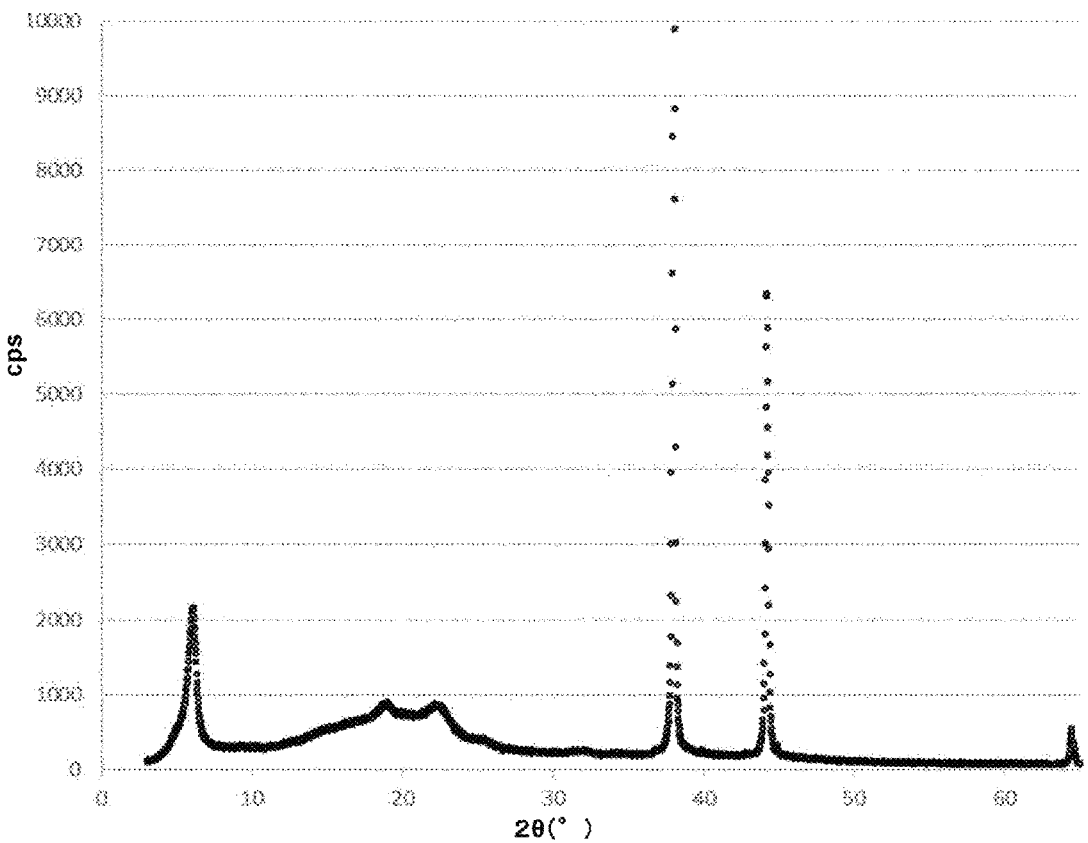
FIG. 6 is a graph showing an XRD pattern obtained by subjecting the conductive film produced in Example 1 to XRD measurement.
Figure 7:
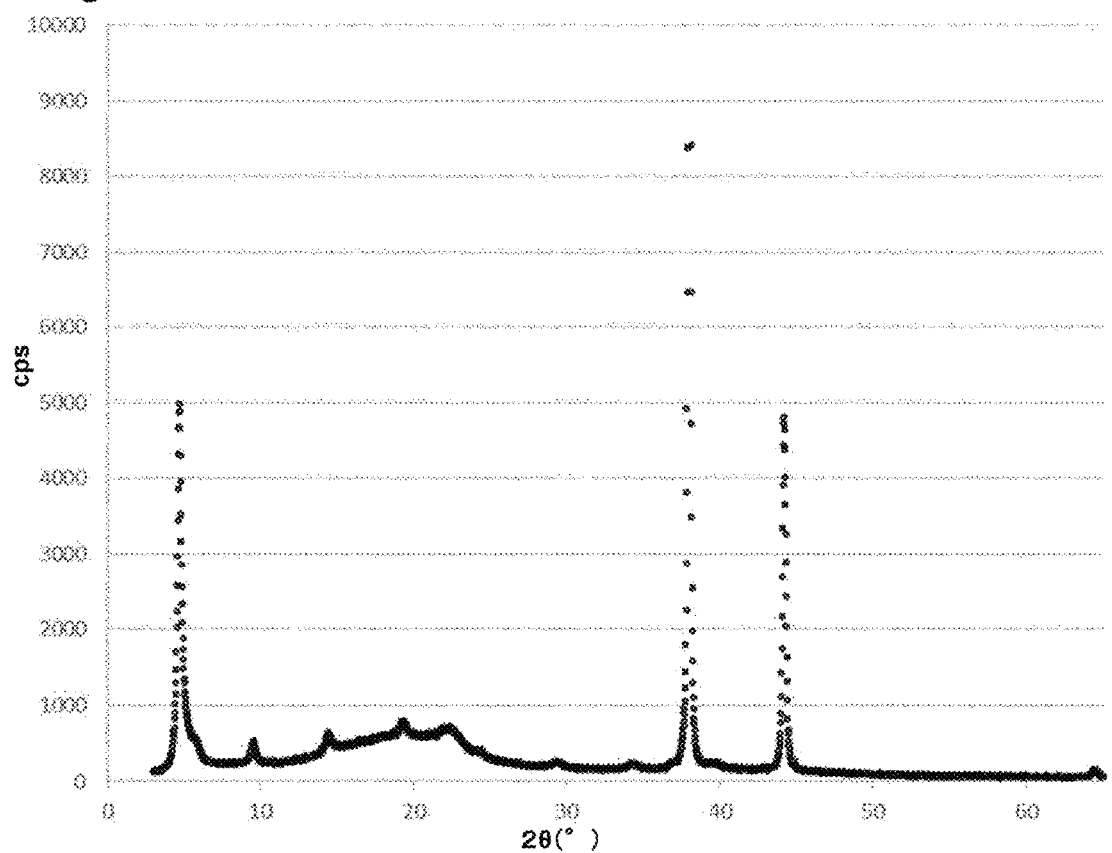
FIG. 7 is a graph showing an XRD pattern obtained by subjecting the conductive film produced in Comparative Example 1 to XRD measurement.
Figure 8:
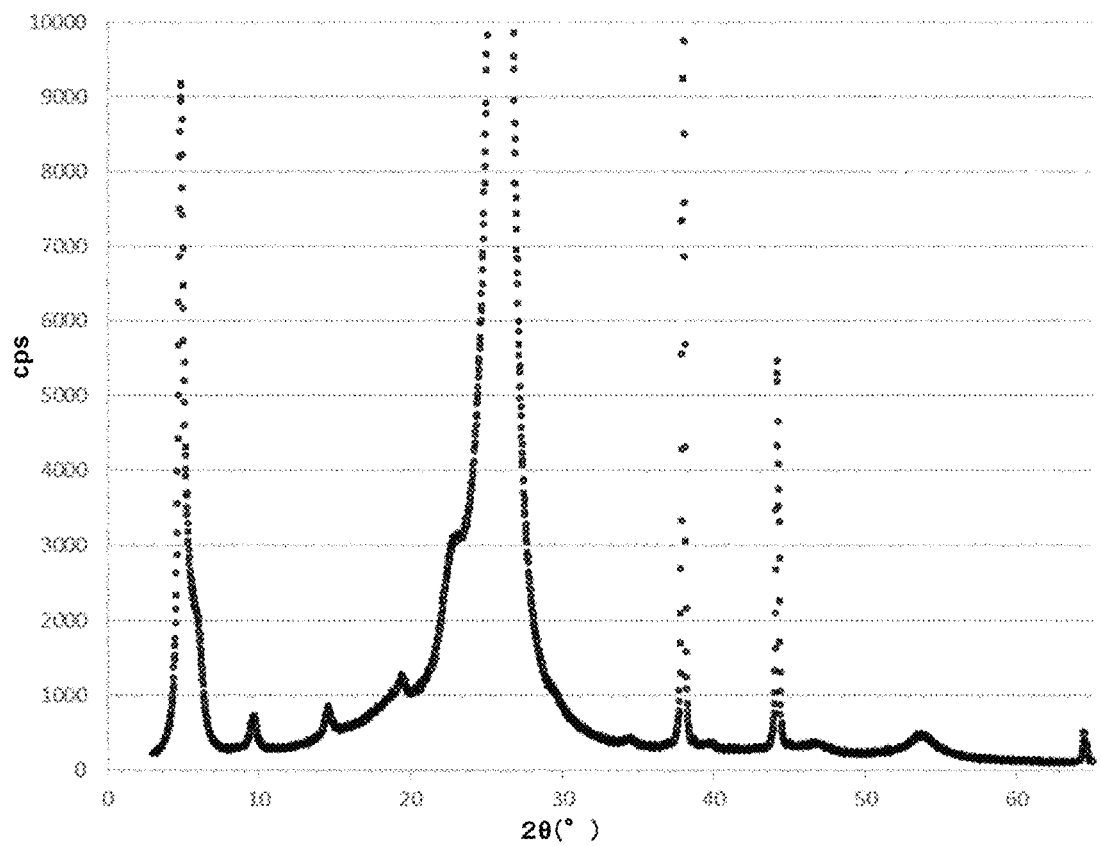
FIG. 8 is a graph showing an XRD pattern obtained by subjecting the conductive film produced in Comparative Example 2 to XRD measurement.

From the XRD patterns in FIGS. 6 to 8, the peak-intensity area $S_{(002)}$ of (002) of MXene ($Ti_3C_2T_s$) was determined with the proviso of $x_1=3°$ and $x_2=7°$, the peak-intensity area $S_{(110)}$ of (110) of MXene ($Ti_3C_2T_s$) was determined with the proviso of $x_3=63°$ and $x_4=65°$, and the peak-intensity area ratio $z$ (%)$=S_{(110)}/S_{(002)}\times 100$ was calculated. The results are shown in Table 2.

TABLE 2

| | Peak-intensity area ratio z (%) |
|---|---|
| Example 1 | 9.5 |
| Comparative Example 1 | 1.7 |
| Comparative Example 2 | 1.6 |

As can be seen from Table 2, the conductive films of Example 1 (with ammonia, shear force applied) exhibited a higher peak-intensity area ratio z than the conductive films of Comparative Example 1 (without ammonia, shear force applied) and Comparative Example 2 (with ammonia, shear force not applied). Such an increase in the peak-intensity area ratio z is considered to be due to the existence of the 3D network of MXene (via ammonium ions and/or with ammonium ions removed).

Coatability of Paste

Table 1 also shows the coatability of the pastes when they were coated onto the substrates and dried in Examples 1, Comparative Examples 1 to 2, and Examples 2 to 8. Further, FIGS. 9 to 13 show photographs of appearance of the conductive films obtained by coating of the pastes onto the substrates and drying of them in Examples 1, Comparative Examples 1 to 2, and Examples 2 and 6.

Figure 9:
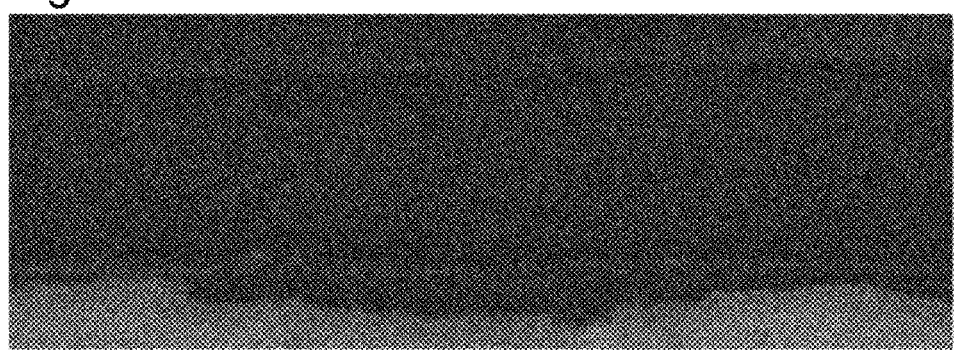
FIG. 9 is a photograph of appearance of a conductive film obtained by coating of the paste produced in Example 1 and drying it.
Figure 10:
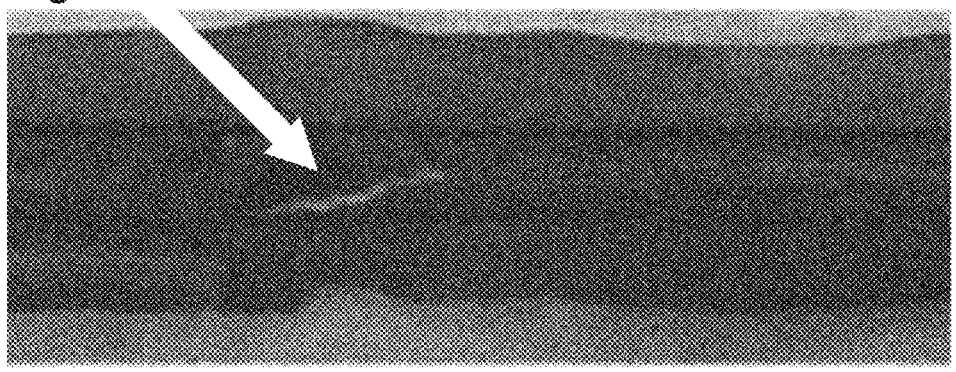
FIG. 10 is a photograph of appearance of a conductive film obtained by coating of the paste produced in Comparative Example 1 and drying it.
Figure 11:
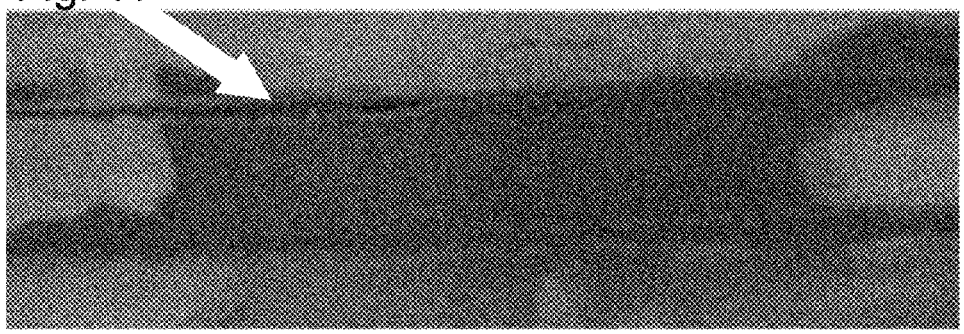
FIG. 11 is a photograph of appearance of a conductive film obtained by coating of the paste produced in Comparative Example 2 and drying it.

As shown in FIG. 9, the paste of Example 1 was able to form a conductive film without crack and without unevenness (with a substantially uniform thickness), and exhibited excellent coatability. As shown in FIGS. 10 to 11, the pastes of Comparative Examples 1 to 2 had cracks caused in the conductive films (indicated by white arrows in the FIGS. 10 to 11) and were inferior in coatability, and the conductive films did not have sufficient strength. Such a difference is considered to be due to the fact that the paste of Example 1 has a higher viscosity than the pastes of Comparative Examples 1 to 2.

Figure 12:
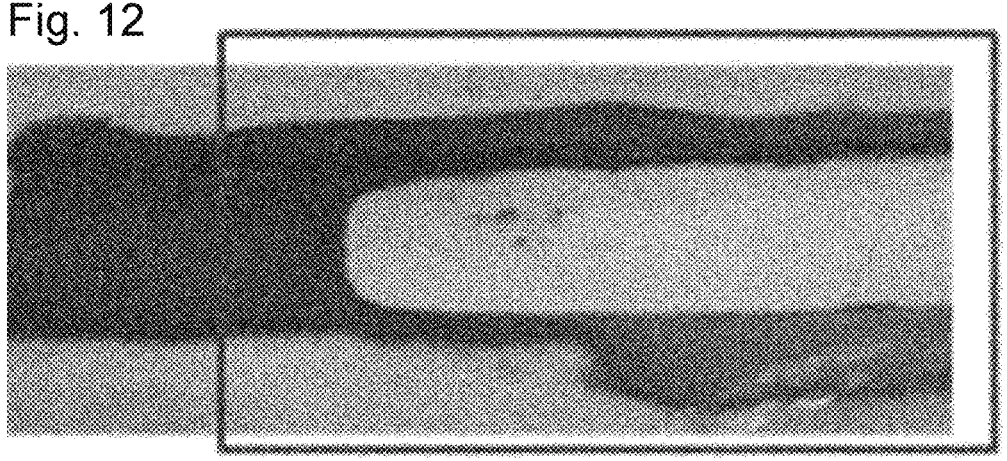
FIG. 12 is a photograph of appearance of a conductive film obtained by coating of the paste produced in Example 2 and drying it.
Figure 13:
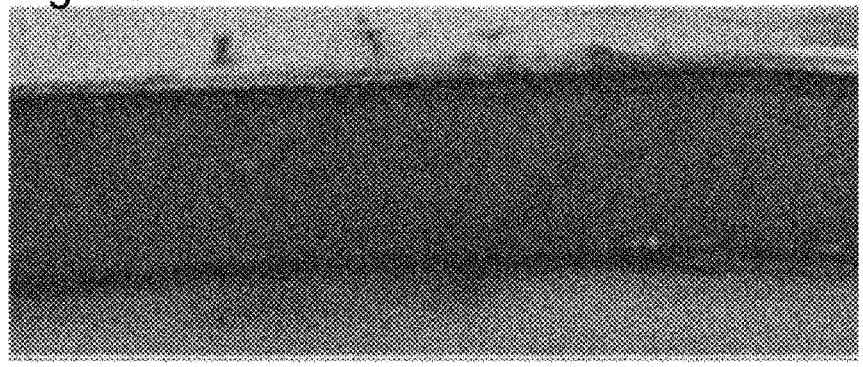
FIG. 13 is a photograph of appearance of a conductive film obtained by coating of the paste produced in Example 6 and drying it.

As shown in FIG. 12, the paste of Example 2 (low ammonia concentration) had low wettability to the substrate (poor adaptivity), was hard to spread (shown by a frame in the FIG. 12), and was inferior in coatability. The pastes of Examples 3, 4, 7, and 8 were able to form conductive films without crack and without unevenness and exhibited excellent coatability, similarly to the paste of Example 1. As shown in FIG. 13, in the paste of Example 6 (high ammonia concentration), MXene particles formed aggregates, and unevenness was caused in the conductive film (thickness became uneven). The paste of Example 5 was also the same as the paste of Example 6. From the results of Examples 1 to 8, it has been confirmed that when the conductive film is formed by coating of the paste, excellent coatability can be obtained when the ammonia concentration in the ammonia water constituting the MXene-ammonia water mixture is not less than 0.005 mol/L and less than 1.3 mol/L, and more specifically, not less than 0.01 mol/L and not more than 1.2 mol/L as shown in Examples 1, 3, 4, 7, and 8.

The paste and conductive film of the present invention can be used in any suitable application, and can be particularly, preferably used, for example, as electrodes in electrical devices.

This application is based upon and claims priority to Provisional U.S. Patent Application No. 62/981,737 filed in the United States Patent and Trademark Office on Feb. 26, 2020, the entire contents of which are incorporated herein by reference.

REFERENCE SIGNS LIST 1a, 1b Layer body ($M_mX_n$ layer)
3a, 5a, 3b, 5b Modifier or terminal T
7a, 7b MXene layer
10, 10a, 10b MXene (layered material)
11 Ammonia aqueous solution
20 Paste
30, 60 Conductive film

The invention claimed is:

1. A paste comprising:
an ammonia aqueous solution; and
particles of a layered material in the ammonia aqueous solution, the particles of the layered material comprising one or plural layers, the one or plural layers comprising a layer body represented by:

$M_mX_n$ wherein
M is at least one metal of Group 3, 4, 5, 6, or 7,
X is a carbon atom, a nitrogen atom, or a combination thereof,
n is not less than 1 and not more than 4, and
m is more than n but not more than 5, and
a modifier or terminal T exists on a surface of the layer body, wherein T is at least one selected from the group consisting of a hydroxyl group, a fluorine atom, a chlorine atom, an oxygen atom, and a hydrogen atom,
wherein the paste has a viscosity of 1 Pa·s or more at a shear velocity of 1/s when the paste has a solid content concentration of 1.0% by mass.

2. The paste according to claim 1, wherein the M is at least one selected from the group consisting of Ti, Zr, Hf, V, Nb, Ta, Cr, Mo, and Mn.

3. The paste according to claim 1, wherein the M is Ti, the X is C, the n is 2, and the m is 3.

4. The paste according to claim 1, wherein an ammonia concentration in the ammonia aqueous solution is not less than 0.005 mol/L and less than 1.3 mol/L.

5. The paste according to claim 1, wherein the particles are arranged in a three-dimensional network via ammonium ions.

6. A conductive film comprising:
particles of a layered material comprising one or plural layers, the one or plural layers comprising a layer body represented by:

$$M_mX_n$$

wherein
M is at least one metal of Group 3, 4, 5, 6, or 7,
X is a carbon atom, a nitrogen atom, or a combination thereof,
n is not less than 1 and not more than 4, and
m is more than n but not more than 5, and
a modifier or terminal T exists on a surface of the layer body, wherein T is at least one selected from the group consisting of a hydroxyl group, a fluorine atom, a chlorine atom, an oxygen atom, and a hydrogen atom,
wherein a ratio of $S_{(110)}$ to $S_{(002)}$ is 2.0% or more when the conductive film is subjected to X-ray diffraction measurement, where $S_{(002)}$ and $S_{(110)}$ represent peak-intensity areas of (002) and (110) of the layered material, respectively, and wherein the conductive film further comprises ammonia.

7. The conductive film according to claim 6, wherein the M is at least one selected from the group consisting of Ti, Zr, Hf, V, Nb, Ta, Cr, Mo, and Mn.

8. The conductive film according to claim 6, wherein the M is Ti, the X is C, the n is 2, and the m is 3.

9. A method for producing a paste, the method comprising:
preparing a mixture of an ammonia aqueous solution and particles of a layered material comprising one or plural layers, the one or plural layers comprising a layer body represented by:

$$M_mX_n$$

wherein
M is at least one metal of Group 3, 4, 5, 6, or 7,
X is a carbon atom, a nitrogen atom, or a combination thereof,
n is not less than 1 and not more than 4, and
m is more than n but not more than 5, and
a modifier or terminal T exists on a surface of the layer body, wherein T is at least one selected from the group consisting of a hydroxyl group, a fluorine atom,
a chlorine atom, an oxygen atom, and a hydrogen atom; and
applying a shear force to the mixture to obtain a paste having a viscosity higher than that of the mixture.

10. The method for producing the paste according to claim 9, wherein the M is at least one selected from the group consisting of Ti, Zr, Hf, V, Nb, Ta, Cr, Mo, and Mn.

11. The method for producing the paste according to claim 9, wherein the M is Ti, the X is C, the n is 2, and the m is 3.

12. The method for producing the paste according to claim 9, wherein an ammonia concentration in the ammonia aqueous solution is not less than 0.005 mol/L and less than 1.3 mol/L.

13. A method for producing a conductive film, the method comprising:
forming a precursor of a conductive film using the paste produced by the method according to claim 9; and
drying the precursor to obtain a conductive film.

14. The method for producing the conductive film according to claim 13, further comprising removing ammonia during and/or after the drying.

15. A paste comprising:
particles of a layered material in an ammonia aqueous solution, the particles of the layered material comprising one or plural layers, the one or plural layers comprising a layer body represented by:

$$M_mX_n$$

wherein
M is at least one metal of Group 3, 4, 5, 6, or 7,
X is a carbon atom, a nitrogen atom, or a combination thereof,
n is not less than 1 and not more than 4, and
m is more than n but not more than 5, and
a modifier or terminal T exists on a surface of the layer body, wherein T is at least one selected from the group consisting of a hydroxyl group, a fluorine atom,
a chlorine atom, an oxygen atom, and a hydrogen atom, wherein the particles are arranged in a three-dimensional network via ammonium ions.

16. The paste according to claim 15, wherein the M is at least one selected from the group consisting of Ti, Zr, Hf, V, Nb, Ta, Cr, Mo, and Mn.

17. The paste according to claim 15, wherein the M is Ti, the X is C, the n is 2, and the m is 3.

18. The paste according to claim 15, wherein an ammonia concentration in the ammonia aqueous solution is not less than 0.005 mol/L and less than 1.3 mol/L.

* * * * *